United States Patent
Veloso

[11] Patent Number: 6,122,508
[45] Date of Patent: Sep. 19, 2000

[54] MOBILE RADIO SYSTEM WITH WIRELINE SUBSCRIBER LINES

[75] Inventor: Artur Veloso, Göppingen, Germany

[73] Assignee: Alcatel, Paris, France

[21] Appl. No.: 08/764,790

[22] Filed: Dec. 12, 1996

[30] Foreign Application Priority Data

Dec. 16, 1995 [DE] Germany .......................... 195 47 110

[51] Int. Cl.⁷ .............................. H04Q 7/20; H04Q 7/22; H04Q 7/24

[52] U.S. Cl. ......................... 455/433; 455/432; 455/560; 455/550; 455/557; 455/74; 455/74.1; 455/422; 455/555; 235/380; 370/338; 370/360; 370/384; 370/385

[58] Field of Search ..................... 455/433, 432, 455/560, 550, 558, 557, 466, 554, 462, 422, 555, 74, 74.1; 235/380; 370/338, 360, 384, 385, 386, 537, 538, 539, 540, 541

[56] References Cited

U.S. PATENT DOCUMENTS

| | | | |
|---|---|---|---|
| 5,355,402 | 10/1994 | Weis et al. ................................. | 379/61 |
| 5,418,838 | 5/1995 | Havermans et al. ..................... | 455/560 |
| 5,528,668 | 6/1996 | Aihara ...................................... | 455/560 |
| 5,544,226 | 8/1996 | Weis et al. ............................... | 455/555 |
| 5,577,103 | 11/1996 | Foti ......................................... | 455/433 |
| 5,586,166 | 12/1996 | Turban ..................................... | 379/58 |
| 5,633,484 | 5/1997 | Zancho et al. .......................... | 235/380 |
| 5,664,005 | 9/1997 | Emery et al. ............................ | 455/433 |
| 5,675,629 | 10/1997 | Raffel et al. ............................. | 455/462 |
| 5,680,439 | 10/1997 | Aquilera et al. ........................ | 455/422 |

FOREIGN PATENT DOCUMENTS

| | | |
|---|---|---|
| 0546467 | 6/1993 | European Pat. Off. . |
| 0562494 | 9/1993 | European Pat. Off. . |
| 0615210 | 9/1994 | European Pat. Off. . |
| 4008790 | 9/1991 | Germany . |
| 4118993 | 12/1992 | Germany . |
| 4230561 | 5/1993 | Germany . |
| 4140974 | 6/1993 | Germany . |
| 4315621 | 11/1994 | Germany . |
| 4420462 | 12/1995 | Germany . |
| 8909518 | 10/1989 | WIPO . |
| 9426073 | 11/1994 | WIPO . |

OTHER PUBLICATIONS

"Fixed Cellular Access", J. Garcia Aguilera, *Electrical Communication*, 1st Quarter 1995, pp. 43–46.

"RURTEL: A Microwave System for Rural Telecommunication", H. Ligotky, *Electrical Communication*, vol. 63, No. 3, 1989, pp. 200–210.

"HF Communications for Wide Area Networks", F. Barcio et al, *Electrical Communication*, vol. 65, No. 3,, pp. 270–279.

*Primary Examiner*—Fan Tsang
*Assistant Examiner*—Keith Ferguson
*Attorney, Agent, or Firm*—Ware, Fressola, Van Der Sluys & Adolphson LLP; Milton Oliver

[57] ABSTRACT

Mobile radio systems with mobile switching centers to which at least one private branch exchange for providing wireline subscriber lines is connected, are known. The branch exchanges require an expensive switching technology and are not capable of providing mobile-radio-specific service features at the wireline subscriber terminals. For the purpose of providing a mobile radio system (MRS) of simple construction accessible also to wireline subscribers, a mobile switching center (MSC) is proposed comprising an interface unit (IF) for interfacing to a concentrator (FSU) which combines a plurality of subscriber lines of wireline subscriber terminals (T1 to Tn). Accordingly, each of the wireline subscriber terminals is connected in such a way that it is treated like a mobile radio terminal, and offered the same available service options. The administration of the subscribers of the wireline subscriber terminals (T1 to Tn) is preferably implemented via a home location register (HLR) and the wireline subscriber terminals include card reading devices for reading authorization cards (SIM).

7 Claims, 1 Drawing Sheet

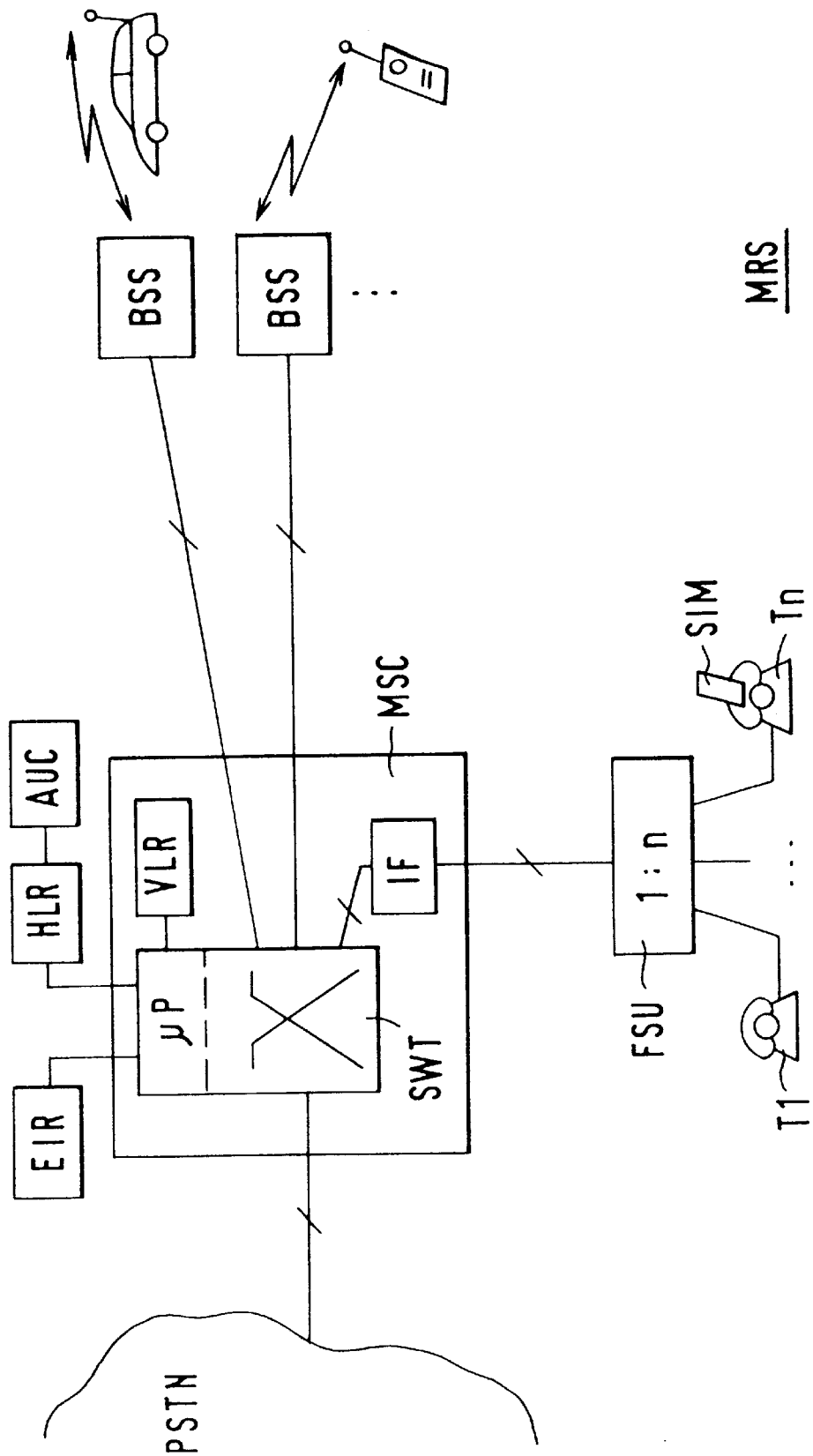

MOBILE RADIO SYSTEM WITH WIRELINE SUBSCRIBER LINES

BACKGROUND OF THE INVENTION

1. Field of the Invention

The present invention relates to a mobile radio system and, more particularly, to such a system with wireline subscriber lines.

2. Description of the Related Art

In order to provide wireline subscriber lines in a mobile radio system, it is known from WO 94/2 60 73 to connect a mobile switching center of the mobile radio system to at least one private branch exchange to which wireline subscriber terminals can be connected. One of the private branch exchanges is part of a so-called "subscriber services arrangement" which offers mobile radio subscribers the same type of service features offered by the branch exchanges to subscribers of wireline subscriber terminals. In WO 94/26073, only the basic principle was described for connecting subscribers of wireline subscriber terminals to a mobile switching center by means of private branch exchanges. Also not described in detail were the resources required for the mobile radio system, especially for the mobile switching center. Since the wireline subscriber lines in the conventional mobile radio system are provided by private branch exchanges, the exchanges require expensive technology. In addition, the included service features available to the wireline subscriber lines are only those features provided by the private branch exchanges, but not the features provided by the mobile radio system.

From the article "Fixed Cellular Access", by J. M. Garcia Aguilera, published in the journal *Electrical Communication,* Issue 1/1995, Alcatel Alsthom Publications S.S., Paris, there is known a mobile radio system adapted for the connection of wireline subscriber terminals. This is accomplished by providing a radio station with subscriber line interfaces, with a concentrator interfaced therewith and with radio transceivers connected thereto. The radio transceivers are in turn connected to a base station of the mobile radio system via wireless means. Consequently, the radio station functions as a stationary terminal for a plurality of stationary subscribers. Although these subscribers enjoy service features offered by the mobile radio network, a radio station required for this purpose is expensive to construct.

SUMMARY OF THE INVENTION

It is the object of the invention to provide a mobile radio system of simple construction which provides access for wireline subscribers, and means for implementing such system.

According to a first aspect of the present invention, a mobile switching center comprises an interface unit for interfacing to a concentrator which combines a plurality of subscriber lines of wireline subscriber terminals.

In further accord with this first aspect of the present invention, the interface unit connects the subscriber lines combined by means of the concentrator to a controlled switching network of the mobile switching center in such a way that each of the subscriber lines is connected to the switching network in the same way as a mobile subscriber terminal. The interface unit could be a multiplexer and a demultiplexer in order to permit connection of the concentrator via a multichannel link. The link could be an optical-fiber link or a radio link, in which case the interface unit would comprise electro-optical transducers or a transceiver.

In further accord with the first aspect of the present invention, for the purpose of switching connections to the subscriber terminals, the interface unit is connected to a database which contains information for identifying the wireline subscriber terminals or for identifying subscribers who use the wireline subscriber terminals. The database may be a home location register which contains information on mobile subscribers and on the subscribers who use the subscriber terminals.

According to a second aspect of the present invention, a mobile radio system comprises a mobile switching center which includes an interface unit for interfacing to a concentrator which combines a plurality of subscriber lines of wireline subscriber terminals.

According further to this second aspect of the present invention, for the purpose of switching connections to the subscriber terminals, the interface unit is connected to a database which contains information for identifying subscribers who use the wireline subscriber terminals, each of the subscriber terminals comprising a device for reading data from storage means containing the information for identifying the respective subscriber.

In still further accord with this second aspect of the present invention, the storage means are authorization cards which are readable by both mobile terminals and the wireline terminals.

Accordingly, the mobile switching center according to the invention comprises an interface unit for interfacing to a concentrator which combines a plurality of subscriber lines of wireless subscriber terminals.

Consequently, each of the wireline subscriber terminals is connected to the mobile switching center in such a way that the mobile switching center can handle the wireline subscriber terminals in the same way as mobile radio terminals. According to the invention, the switching of connections from or to subscribers within the mobile radio system is handled by the mobile switching center, regardless if the subscriber uses a mobile radio terminal or one of the wireline subscriber terminals. The mobile radio system according to the invention is of rather simple construction, since only an interface unit is required as means for connecting the wireline subscriber terminals. No costly equipment, such as a branch exchange or a plurality of radio transceivers, is required.

These and other objects, features and advantages of the present invention will become more apparent in light of the detailed description of a best mode embodiment thereof, as illustrated in the accompanying drawing.

BRIEF DESCRIPTION OF THE DRAWING

In addition, the invention is described with reference to one embodiment and with reference to a single drawing which shows the construction of a mobile radio system with a mobile switching center in form of a block diagram.

DESCRIPTION OF THE PREFERRED EMBODIMENT

In the FIGURE, there is shown a mobile radio system MRS comprising at least one mobile switching center MSC connected to a public service telephone network PSTN. In addition, the mobile radio system comprises a plurality of stationary radio station controls connected to the mobile switching center and interfacing with stationary radio stations for supplying radio cells, all of which together form the radio service area of the mobile radio system. In the FIGURE, there is a simplified representation of two so-called base station subsystems BSS, each of which comprises a stationary radio station control and a plurality of stationary radio stations. These base station subsystems are connected via, for example, PCM 30 connections to the mobile switching center MSC which switches connections within the mobile radio system as well as connections between the mobile radio system and the public service telephone network. For the purpose of switching those connections, the mobile switching center comprises a controlled switching network SWT which is connected to both the base station subsystems BSS and the public service telephone network PSTN. The switching network SWT is controlled by processor-controlled control units μp, one of which is shown here as an example.

The mobile radio system MRS illustrated here has to comply with the requirements of the GSM-Standard for cellular mobile radio networks. For this purpose, the mobile radio system comprises the following databases which are interfaced with the controlled switching network: a terminal register EIR, a home location register HLR, an authentication center AUC and a visitor location register VLR. The functions for these databases which are required in order to comply with the GSM-Standard, are not part of the present invention and will be discussed only briefly hereinafter. The terminal register EIR stores the identifications of the terminals used in the mobile radio system. In addition to the identifications, blocking warnings are stored in the event that terminals are reported as stolen and are to be excluded from use within the mobile radio system. The home location register HLR primarily contains data about those subscribers of the mobile radio system who are located within the service area of the mobile switching center MSC. Stored in the home location register HLR are, for example, subscriber profiles providing information about the services subscribers are able to and entitled to use. Also stored in the home location register HLR is the present location of each subscriber by referring to the visitor location register responsible for this respective location. It is the primary responsibility of the authentication center AUC to protect the privacy codes for encoding the data transmitted via the radio channels. The visitor location register VLR which is integrated into the mobile switching center MSC, stores the subscriber data of those subscribers who are presently located in the service area of this mobile switching center and which are not stored in the home location register HLR.

The afore-described construction of the mobile radio system MRS is basically identical to the construction of a cellular mobile radio system according to the GSM-Standard (GSM: Global System for Mobile Communication). In order to provide access to the mobile radio system not only for mobile subscribers, but also for wireline subscribers, the mobile switching center MSC of the invention is provided with an interface IF which is in turn connected to the controlled switching network SWT and interfaced with a concentrator FSU, the concentrator FSU providing a plurality of subscriber lines for wireline terminals T1 to Tn.

The interface unit IF is a processor-controlled unit which emulates the connection of a base station subsystem with respect to the controlled switching network SWT. Consequently, connecting the interface unit to the controlled switching network is the same as connecting an additional base station subsystem, like one of the BSS shown. With respect to the concentrator, the interface unit emulates a multiplexed connection, in this case, for example, a PCM 30 connection. The concentrator FSU is connected to the interface unit IF via a multichannel link (trunk group). An optical fiber link or a radio link may also be employed instead of a multichannel link. In this case, however, the interface unit and the concentrator would require additional electro-optical transducers and radio transceivers, respectively. The concentrator FSU distributes the trunk group received from the mobile switching center to the different subscriber terminals T1 to Tn. In the opposite direction, the subscriber terminals are combined via the concentrator. Consequently, the concentrator FSU functions in the same way as a demultiplexer or multiplexer. The concentrator can be easily implemented and does not require additional features, in particular no additional switching features.

Since each of the subscriber lines is connected to the controlled switching network SWT via the concentrator FSU and via the interface unit IF, each of these subscriber lines is treated within the mobile switching center MSC in the same way as a connection of a mobile subscriber. According to the invention, the home location register HLR administers each of these subscriber lines in the same fashion as a connection of a mobile subscriber. The mobile switching center MSC switches connections from and to the subscribers on the wireline terminals in the same way as connections from and to mobile subscribers on mobile radio terminals (mobile subscriber terminals). For this purpose, a subscriber identification is assigned to each of the wireline subscriber terminals and stored in the home location register HLR.

The subscriber identification number assigned to a subscriber terminal can now advantageously be changed, in that each of the subscriber terminals can be provided with a reading device for reading storage means SIM having information stored therein for identifying the subscriber presently activating this subscriber terminal. Here, the storage means is a so-called authorization card (subscriber identity module) which allows the subscriber to access the mobile radio system. The reading devices in the wireline subscriber terminals T1 to Tn correspond to so-called card readers adapted to read these authorization cards. As a result, a subscriber is not only able to use any one of the mobile subscriber terminals within the mobile radio system, but is also able to use any of the wireline subscriber terminals T1 to Tn connected to the mobile switching center MSC. Consequently, the wireline subscriber terminals T1 to Tn so adapted can be used by the subscribers in the same fashion as mobile subscriber terminals. The subscriber terminals T1 to Tn connected to the concentrator FSU form a group of subscriber terminals which is equivalent to a group of mobile subscriber terminals included in the base station subsystem BSS. The mobile switching center MSC with the interface unit IF and the home location register HLR are implemented in such a way that the subscribers on the wireline subscriber terminals are treated like mobile subscribers within a base station subsystem. Consequently, the group of wireline subscriber terminals T1 to Tn connected to the mobile switching center NSC according to the invention forms a "virtual base station subsystem".

A connection of wireline subscriber terminals to a mobile switching center as described above can be particularly advantageously employed where an infrastructure for mobile subscribers is already in existence, but where an additional infrastructure of simple construction for wireline subscribers is desired. In this way, the network operator of the mobile radio system can, for example, offer also wireline terminals to the mobile subscribers. By connecting such wireline terminals equipped with a card reading device, the subscriber is able to access to the mobile radio system either via any mobile radio terminal or via these wireline subscriber terminals by using only a single authorization card.

The concentrator may conceivably also be installed far away from the mobile switching center at a location where wireless service is not feasible for technical or business reasons. In this way, the network operator of the mobile radio system can offer mobile-radio-specific service features also to subscribers who are not located in the radio service area of his mobile radio system.

The invention as described above is not restricted to cellular mobile radio networks, but is applicable to all mobile radio systems comprising switching means.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A mobile switching center (MSC) comprising:

a controlled switching network (SWT) for connection to one or more base station subsystems (BSS), said one or more base station subsystems (BSS) serving for communicating by radio with mobile subscriber terminals; and an interface unit (IF) connected to the controlled switching network (SWT) for interfacing to a concentrator (FSU) which combines a plurality (n) of wireline subscriber lines of wireline subscriber terminals (T1 to Tn), wherein the interface unit connects the subscriber lines, combined by means of the concentrator, to the controlled switching network (SWT) in such a way that each of the wireline subscriber lines is connected to the switching network with the same available service features as those afforded to a mobile subscriber terminal, and wherein the interface unit comprises a multiplexer and a demultiplexer to permit connection of the concentrator (FSU) via a multichannel link.

2. A mobile switching center (MSC) as claimed in claim 1, wherein the link is an optical-fiber link or a radio link, and wherein the interface unit (IF) comprises electro-optical transducers or a transceiver.

3. A mobile switching center (MSC) as claimed in claim 1, wherein for the purpose of switching connections to the subscriber terminals, the interface unit (IF) is connected to a data base (HLR) which contains information for identifying the wireline subscriber terminals (T1 to Tn) or for identifying subscribers who use the wireline subscriber terminals (T1 to Tn).

4. A mobile switching center (MSC) as claimed in claim 3, wherein the data base is a home location register (HLR) which contains information on mobile subscribers and on the subscribers who use the subscriber terminals (T1 to Tn).

5. A mobile radio system (MRS) comprising a mobile switching center (MSC) adapted for connection to a plurality of mobile radio base stations (BSS) and which includes an interface unit (IF) and a concentrator (FSU) which combines a plurality of subscriber lines of wireline subscriber terminals (T1 to Tn) and connects them through the interface unit (IF) to a switching network (SWT) within said mobile switching center (MSC), so that said center can make available to said wireline terminals all services available to mobile subscribers via said mobile radio base stations.

6. A mobile radio system (MRS) as claimed in claim 5, wherein for the purpose of switching connections to the subscriber terminals, the interface unit (IF) is connected to a data base (HLR) which contains information for identifying subscribers who use the wireline subscriber terminals (T1 to Tn), each of the subscriber terminals (T1 to Tn) comprising a device for reading data from storage means (SIM) containing the information for identifying the respective subscriber.

7. A mobile radio system (MRS) as claimed in claim 5, wherein the storage means are authorization cards (SIM) which are readable by both mobile terminals and the wireline terminals (T1 to Tn).

* * * * *